(12) United States Patent
Sullenberger et al.

(10) Patent No.: US 10,904,217 B2
(45) Date of Patent: Jan. 26, 2021

(54) ENCRYPTION FOR GATEWAY TUNNEL-BASED VPNS INDEPENDENT OF WAN TRANSPORT ADDRESSES

(71) Applicant: Cisco Technology, Inc., San Jose, CA (US)

(72) Inventors: Michael L. Sullenberger, San Jose, CA (US); Brian Weis, San Jose, CA (US); Warren Scott Wainner, Sterling, VA (US); Shuxian Lou, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 194 days.

(21) Appl. No.: 15/994,590

(22) Filed: May 31, 2018

(65) Prior Publication Data

US 2019/0372936 A1 Dec. 5, 2019

(51) Int. Cl.
*H04L 29/00* (2006.01)
*H04L 29/06* (2006.01)
*H04L 9/08* (2006.01)

(52) U.S. Cl.
CPC .......... *H04L 63/0272* (2013.01); *H04L 9/083* (2013.01); *H04L 63/029* (2013.01); *H04L 63/0428* (2013.01); *H04L 63/164* (2013.01)

(58) Field of Classification Search
CPC . H04L 63/0272; H04L 67/10; H04L 12/4641; H04L 63/08; H04L 63/164
See application file for complete search history.

(56) References Cited

U.S. PATENT DOCUMENTS

| | | | |
|---|---|---|---|
| 4,322,577 | A | 3/1982 | Braendstroem |
| 6,079,020 | A | 6/2000 | Liu |
| 6,981,064 | B1 | 12/2005 | Phadnis et al. |
| 7,234,058 | B1 | 6/2007 | Baugher et al. |
| 7,234,063 | B1 | 6/2007 | Baugher et al. |
| 7,350,227 | B2 | 3/2008 | McGrew et al. |

(Continued)

OTHER PUBLICATIONS

Ramkumar, Mahalingnam, "Trustworthy Computing under Resource Constraints with the DOWN Policy", IEEE Transactions on Dependable and Secure Computing, vol. 5, No. 1, Jan.-Mar. 2008, 13 pgs.

(Continued)

*Primary Examiner* — Ghazal B Shehni
(74) *Attorney, Agent, or Firm* — Edell, Shapiro & Finnan, LLC

(57) ABSTRACT

A source virtual private network (VPN) gateway supports a local source subnet and communicates over a wide area network (WAN) with a destination VPN gateway that supports a local destination subnet. The source VPN gateway receives from the local source subnet an Internet Protocol (IP) packet destined for the local destination subnet, determines a security association (SA) based on a source IP address and a destination IP address of the IP packet, and encapsulates the IP packet with tunnel encapsulation including a tunnel protocol header and a tunnel outer IP header, to produce a clear-text tunnel packet. The source VPN gateway encrypts the IP packet and the tunnel protocol header but not the tunnel outer IP header using an encryption key and a security parameter index for the SA, to produce an encrypted tunnel packet, and tunnels it to the destination VPN gateway over the WAN.

20 Claims, 10 Drawing Sheets

(56) References Cited

U.S. PATENT DOCUMENTS

| | | |
|---|---|---|
| 7,418,100 B2 | 8/2008 | McGrew et al. |
| 7,447,901 B1 | 11/2008 | Sullenberger et al. |
| 7,509,491 B1 | 3/2009 | Wainner et al. |
| 7,650,500 B2 | 1/2010 | Matoba |
| 8,155,130 B2 | 4/2012 | McGrew et al. |
| 8,548,171 B2 | 10/2013 | McGrew et al. |
| 8,891,770 B2 | 11/2014 | McGrew et al. |
| 2003/0056114 A1 | 3/2003 | Goland |
| 2004/0057579 A1 | 3/2004 | Fahrny |
| 2004/0083363 A1 | 4/2004 | Hengeveld |
| 2004/0202184 A1 | 10/2004 | Yazaki et al. |
| 2005/0032506 A1 | 2/2005 | Walker |
| 2005/0033956 A1 | 2/2005 | Krempl |
| 2005/0063542 A1 | 3/2005 | Ryu |
| 2005/0157664 A1 | 7/2005 | Baum et al. |
| 2006/0184999 A1 | 8/2006 | Guichard et al. |
| 2007/0016663 A1 | 1/2007 | Weis |
| 2007/0094374 A1 | 4/2007 | Karia |
| 2007/0209071 A1 | 9/2007 | Weis et al. |
| 2007/0248225 A1 | 10/2007 | Fluhrer |
| 2009/0083536 A1* | 3/2009 | Weis .................. H04L 12/1886 713/153 |
| 2009/0328192 A1* | 12/2009 | Yang .................. H04L 12/4641 726/15 |
| 2010/0220856 A1 | 9/2010 | Kruys et al. |

OTHER PUBLICATIONS

Blom, Rolf, "An Optimal Class of Symmetric Key Generation Systems", Ericsson Radio Systems AB, S-163 80 Stockholm, Sweden, Apr. 1984, 4 pgs.

Blundo, Carlo, et al., "Perfectly-Secure Key Distribution for Dynamic Conferences", Springer-Verlag Berlin Heidelberg, Aug. 1992, 16 pgs.

Blundo, Carlo, et al., "Perfectly-Secure Key Distribution for Dynamic Conferences", Information and Computation, 146, 1-23, Academic Press, Oct. 10, 1998, 23 pgs.

* cited by examiner

ENCRYPTION FOR GATEWAY TUNNEL-BASED VPNS INDEPENDENT OF WAN TRANSPORT ADDRESSES

TECHNICAL FIELD

The present disclosure relates to encryption for gateway tunnel-based virtual private networks (VPNs).

BACKGROUND

Different Internet Protocol (IP) security (IPsec) tunnels may be established between a number N1 of first virtual private network (VPN) gateways at a first site and a number N2 of second VPN gateways at a second site over M wide area networks (WANs) connected to the first and the second VPN gateways. The different IPsec tunnels may use correspondingly different WAN IP addresses for the tunnel-connected VPN gateways. This topology may result in a full mesh of (N1*N2*M) IPsec security associations, which leads to scaling issues as the number of VPN gateways and the number of WANs increase. Conventional techniques to mitigate the scaling issues use group encryption keys to protect traffic tunneled between the VPN gateways. Group encryption keys are considered less secure than pair-wise encryption keys.

DESCRIPTION OF EXAMPLE EMBODIMENTS

Overview

Figure 1:
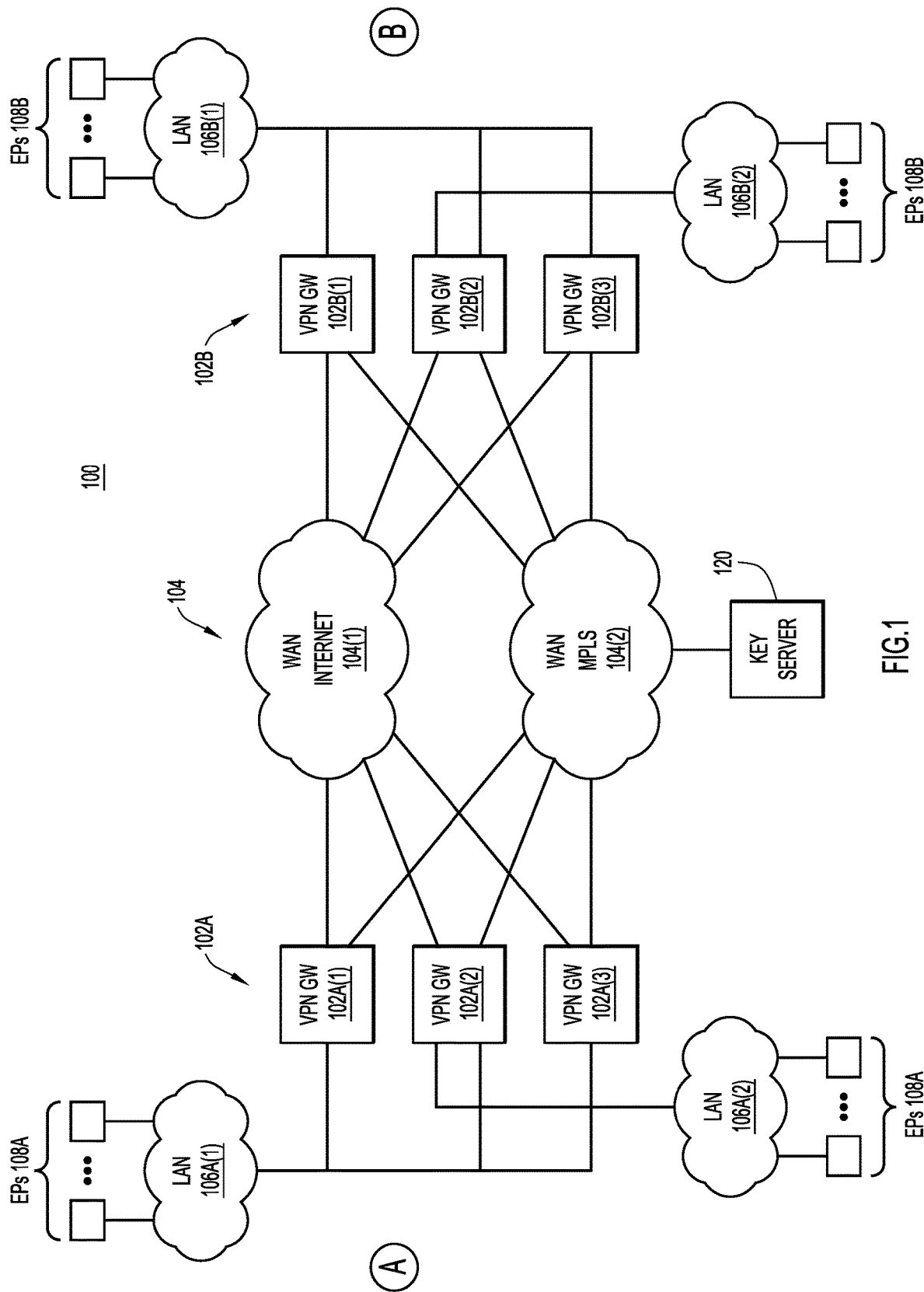
FIG. 1 is a high-level block diagram of a virtual private network (VPN)-wide area network (WAN) environment in which embodiments directed to encryption for gateway tunnel-based VPNs independent of WAN transport addresses may be implemented, according to an example embodiment.

A method is performed by a source virtual private network (VPN) gateway configured to support a local source subnet and communicate over a wide area network with a destination VPN gateway configured to support a local destination subnet. The method includes receiving from the local source subnet an Internet Protocol (IP) packet as clear-text and that is destined for the local destination subnet, determining for the IP packet a security association for an IP security (IPsec) protocol based on a source IP address and a destination IP address of the IP packet, and encapsulating the IP packet with tunnel encapsulation including a tunnel protocol header and a tunnel outer IP header, to produce a clear-text tunnel packet. The method further includes encrypting the IP packet and the tunnel protocol header but not the tunnel outer IP header of the clear-text tunnel packet using an encryption key and a security parameter index associated with the security association, to produce an encrypted tunnel packet, and tunneling the encrypted tunnel packet to the destination VPN gateway over the wide area network via an encrypted tunnel indicated by the tunnel encapsulation.

EXAMPLE EMBODIMENTS

A virtual private network (VPN) extends a private, local area network (LAN) across a wide area network (WAN), such as the Internet. The VPN enables users to send and receive data across the WAN as if their computing devices (i.e., endpoints) were directly connected to the private network. A VPN is created by establishing a virtual point-to-point connection across the WAN that employs dedicated connections, virtual tunneling protocols, and/or traffic encryption/authentication. A VPN gateway device or node (referred to more simply as a "VPN gateway") includes a network device that connects the LAN to the WAN. The resulting interconnected network may be referred to as a VPN-WAN network.

Generally, VPN-WAN networks give rise to complications because:

a. Multiple VPN gateways may support a single VPN site (wherein a VPN site is defined as a LAN subnet/address prefix) and/or set of VPN sites, where each VPN gateway may be connected to different and/or the same WAN (also referred to as a "WAN transport").

b. There may be multiple WAN transports between the VPN gateways of the VPN, where each VPN gateway uses a different address for each WAN transport.

Generally, VPN-WAN networks provide load-sharing, load-balancing, redundancy, and resiliency, both at a WAN transport level and a VPN gateway level. VPN-WAN networks add scaling difficulties when providing encryption between VPN gateways because, in a tunneled encrypted VPN between the VPN gateways, there are multiple VPN gateways and multiple WAN transport paths, each VPN gateway employing its own addressing used for encryption identity and peer addresses (e.g., security associations). A topology including 2 VPN gateway sites with 3 VPN gateways at each site, and 1 transport WAN between the 2 sites is diagrammed below:

Site 1 VPN node 1 (S1Vn1): - - - :Site 2 VPN node 1 (S2Vn1)
Site 1 VPN node 2 (S1Vn2): - - - :Site 2 VPN node 2 (S2Vn2)

Site 1 VPN node 3 (S1Vn3): - - - :Site 2 VPN node 3 (S2Vn3);

The topology presents the following 9 different combinations of VPN/peer addresses for encryption tunnels between the VPN gateways:

1:(S1Vn1-S2Vn1), 2:(S1Vn1-S2Vn2), 3:(S1Vn1-S2Vn3) 4:(S 1Vn2-S2Vn2), 5:(S1Vn2-S2Vn1), 6:(S 1Vn2-S2Vn3)

7:(S1Vn3-S2Vn3), 8:(S1Vn3-S2Vn2), 9:(S1Vn3-S2Vn1)

This means 9 different encrypted tunnels are possible between the two sites. If the number of WAN transports connected to all of the VPN gateways is increased to 3, that multiplies the number of encrypted tunnels by 3 for a total of 27, which does not include the number of combinations including WAN transport cross-over points. Because of this, the number of point-to-point encrypted tunnels and associated security associations can become large. Three approaches may be used to address the above-mentioned issues.

A first approach encrypts LAN-to-LAN data packets based on LAN subnet identifiers (e.g., IP address prefixes) prior to adding tunnel encapsulation so that the number of pair-wise encryption pairs is on the order of the number of different LAN subnets at the two sites. For example, 2 LAN subnets at each site gives 4 encryption combinations (i.e., security associations). This presents the following problems:

a. If there are multiple gateway nodes on each side (i.e., at each site) then there are additional combinations of VPN gateways. For example: 3 VPN gateways give rise to 9 combinations of VPN gateways and 4 combinations of LAN subnets for a total of 36 different security associations.

b. The internal LAN or an identifying address, after Internet Protocol security (IPsec) tunnel-mode encryption, is visible on the WAN transport, which leaks internal information.

c. Encapsulation headers are not encrypted and likely not protected from modification. This is an issue since the encapsulation headers contain information on how to map a just decrypted packet back to its correct local LAN. This is especially critical if there are multiple VPN routing and forwarding (VRF) entries involved and the encapsulation headers contain the VRF information, which are readable on the WAN transports.

A second approach employs tunnel-less group encryption to encrypt the data packets prior to tunnel encapsulation. In this case, there is a single IPsec key/security association across the network, no matter how many VPN gateways or transport networks. This presents the following problems:

a. Using a group key for the whole network is considered less safe than pair-wise keys between gateways.

b. The internal LAN or an identifying address after IPsec tunnel-less encryption is visible on the transport network, which leaks internal information.

c. The encapsulation headers are not encrypted and likely not protected from modification. This presents an issue because the encapsulation headers contain information on how to map a just decrypted packet to the correct LAN.

A third approach uses tunnel-less group encryption to encrypt the data packets after tunnel encapsulation. In this case, there is again a single IPsec key/security association across the network, no matter how many VPN gateways or transport networks. This presents the following problems:

a. Using a group key for the whole network is considered less safe than pair-wise keys between VPN gateways and.

b. Any address modification (e.g., via network address translation (NAT)) between the VPN gateways breaks the tunnel-less encryption so this would only be usable on a private WAN network without NAT.

Embodiments presented herein provide encryption for gateway tunnel-based VPNs independent of WAN transport addresses to overcome the above-mentioned problems.

Referring first to FIG. 1, there is shown a high-level block diagram of an example virtual private network (VPN)-wide area network (WAN) environment 100 in which embodiments directed to encryption for gateway tunnel-based VPNs independent of WAN transport addresses may be implemented. Network environment 100 includes first VPN gateways 102A(1)-102A(3) (collectively referred to as "VPN gateways 102A" and individually referred to as a "VPN gateway 102A") located at a first geographical site A, second VPN gateways 102B(1)-102B(3) (collectively referred to as "VPN gateways 102B" and individually referred to as a "VPN gateway 102B") located at a second geographical site B, and WANs 104(1) and 104(2) (collectively referred to as "WANs 104" and individually referred to as a "WAN 104") coupled to each of VPN gateways 102A and 102B, such that each of VPN gateways 102A may communicate with each of VPN gateways 102B over the WANs. WANs 104 may also be referred to as "WAN transport networks" and "WAN transports." WANs 104 may include the Internet, a Multiprotocol Label Switching (MPLS) network, cellular networks, and the like.

VPN gateways 102A serve/support LANs 106A(1) and 106A(2) (collectively referred to as LANs 106A) coupled to the VPN gateways as shown in FIG. 1. LANs 106A may be segmented such that each LAN represents a respective LAN subnet (also referred to simply a "local network subnet," a "local subnet," or simply a "subnet") identified by a respective IP address prefix (referred to as a "subnet identifier"). VPN gateways 102A provide LANs 106A with access to WANs 104 through the VPN gateways. Similarly, VPN gateways 102B serve/support LANs 106B(1) and 106B(2) (collectively referred to as LANs 106B) coupled to the VPN gateways as shown in FIG. 1. LANs 106B may be segmented such that each LAN represents a respective LAN subnet identified by a respective IP address prefix. VPN gateways 102B provide LANs 106B with access to WANs 104 through the VPN gateways. Thus, respective ones of user endpoint (EP) devices (e.g., computer devices, smartphones, tablets, servers, client devices, and so on) 108A connected to LANs 106A may communicate in end-to-end fashion with respective ones of user endpoint devices 108B connected to LANs 106B through respective ones of VPN LANs 106A, VPN gateways 102A, WANs 104, VPN gateways 102B, and LANs 106B. The VPN-WAN network topology depicted in FIG. 1 represents a non-limiting example, and other topologies are possible.

VPN-WAN environment 100 also includes a key server (KS) 120 configured to communicate with each of VPN gateways 102A and 102B over WANs 104, for example. KS 120 may exist in WAN 104 as a cloud resource. Also, KS 120 may be distributed as a set of KS devices that communicate over WAN 104, one each adjacent to corresponding ones of VPN gateways 102A and 102B. Key server 120 distributes key material associated with a Key Generation System (KGS). Key server 120 generates key material for, and provides the key material to, each of VPN gateways 102A and 102B based on the local subnets supported by each VPN gateway. More specifically, key server 120 generates key material that is associated with/bound to a "source" subnet identifier, such that a VPN gateway in possession of the key material may supply to the key material a "destination" subnet identifier to generate from the key material an encryption key and a security parameter index that is thus bound to the source subnet identifier and the destination subnet identifier. The KGS implements one or more KGS algorithms that enable the aforementioned scheme of combining keying material associated with the source subnet identifier and the identity of the destination subnet to derive the IPsec encryption keys and SPI. Any known or hereafter developed KGS algorithm may be used, such as a KGS algorithm presented in the publication Blom, Rolf, "An Optimal Class of Symmetric Key Generation Systems," Ericsson Radio Systems AB, S-163 80 Stockholm, Sweden, 1998.

Embodiments presented herein that are implemented in VPN-WAN environment 100 perform tunnel-based encryption in a manner that overcomes the above-mentioned problems with conventional tunnel based encryption and tunnel-less encryption. As will be described in detail below, the embodiments employ the following features:

a. Encryption classification (i.e., security associations) and keys are based on subnet identifiers/address prefixes rather than VPN gateway WAN addresses. Thus, the number of VPN Gateways and the number of WAN transports between the VPN gateways is removed from the calculation of the number of possible security associations needed. Also, unique encryption keys (for the security associations) are based only on the combination of source subnet identifier to destination subnet identifier.

b. IPsec transport mode encryption is performed after tunnel encapsulation and the tunnel encapsulation headers (not the outer most IP header) is included in the encryption. This hides and protects the tunnel encapsulation protocol header(s). Also, the outer most IP header can be modified (e.g., via NAT) without causing routing/tunneling disruption.

c. When an encrypted tunnel packet arrives on any VPN gateway that supports the destination subnet, the encrypted tunnel packet may be decrypted and then decapsulated, and the resulting clear-text packet forwarded to its destination.

The embodiments completely separate the encryption address space from the WAN transport addresses and paths, i.e. encryption operates without knowledge of or consideration for multiple VPN gateway sources and destinations, and multiple WAN transports, and does not impact NAT in the WAN transport path.

Figure 2A:
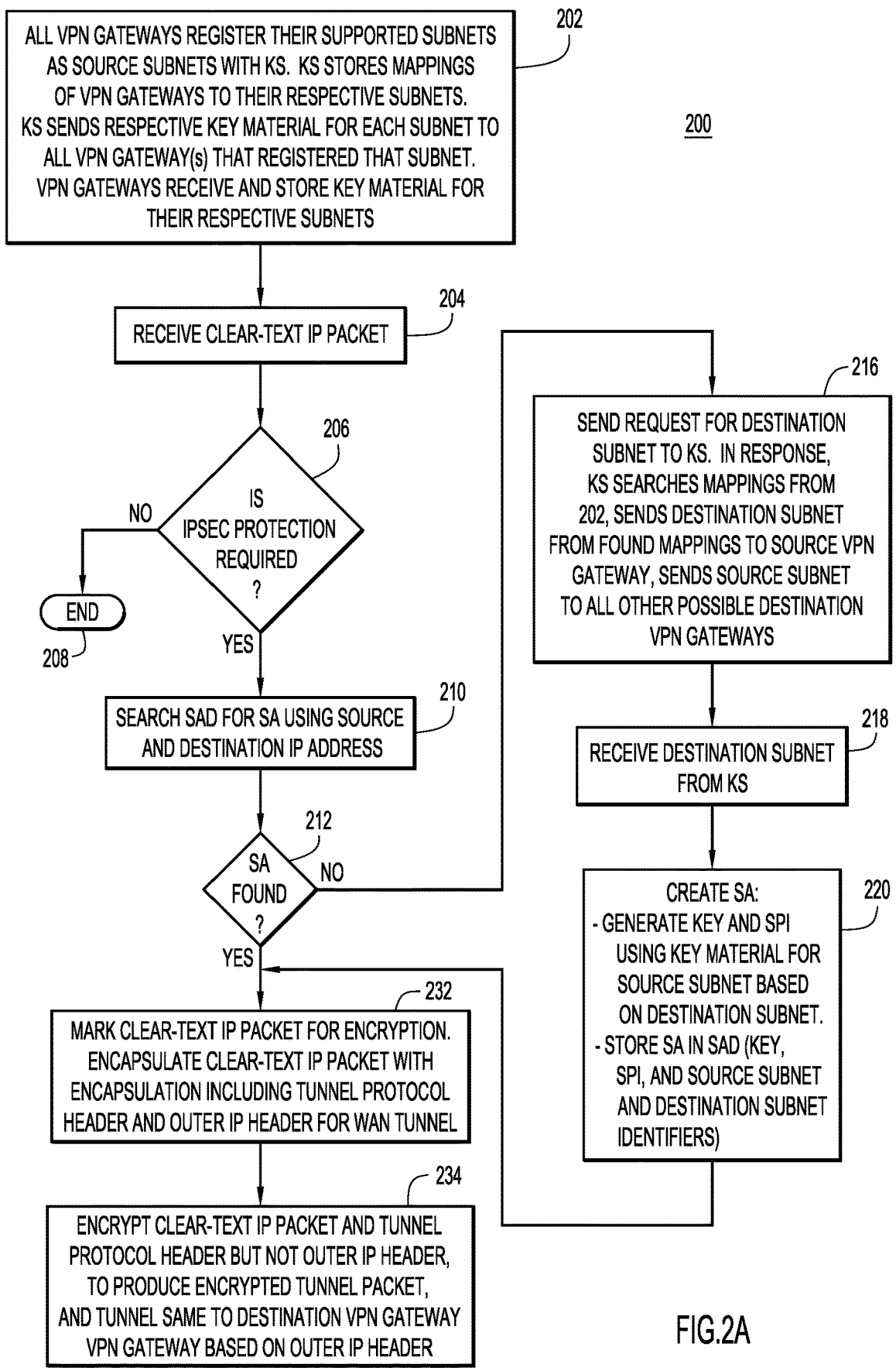
FIG. 2A is a flowchart of a method of encryption for gateway tunnel-based VPNs independent of transport (WAN) addressing performed at a source VPN gateway, according to an example embodiment.

With reference to FIG. 2A, there is a flowchart of an example method 200 of encryption for gateway tunnel-based VPNs independent of transport (WAN) addressing. By way of example, method 200 is described in the context of encryption tunneling of traffic between a source VPN gateway that serves a source subnet (e.g., any of VPN gateways 102A that serve any of LANs 104A) that originates the traffic and a destination VPN gateway that serves a destination subnet (e.g., any of VPN gateways 102B that serve any of LANs 104B) to which the traffic is destined. Method 200 is described also with reference to FIG. 1 and FIG. 3, which shows example data packets after/resulting from various operations of method 200. Method 200 is performed primarily at the source VPN gateway, with assistance from key server 120.

At 202, the source VPN gateway sends a subnet registration request/message to key server 120 to register each of the "source" LAN subnets supported by the source VPN gateway. The subnet registration request includes source subnet identifiers (e.g., IP address prefixes) for each of the subnets supported by the source VPN gateway. In response, key server 120 creates respective key material for each "source" subnet, and sends to the source VPN gateway the respective key material corresponding to/for each subnet (e.g., corresponding to each subnet identifier) listed in the registration request. Key server 120 also stores a mapping of the source VPN gateway to the subnets (e.g., address prefixes) supported by the source VPN gateway. The source VPN gateway receives the respective key materials and stores the key materials in local memory of the VPN gateway. In an example, key server 120 may also store a unique Nonce per unique local subnet that it is being registered with the key server. The Nonces may be used to make a forward direction (VPN GW (A)→VPN GW (B)) encryption key and SPI unique from a reverse direction (VPN GW (B)→VPN GW (A)) encryption key and SPI.

Operation 202 is repeated for each of the VPN gateways 102A and 102B that register their respectively supported "source" subnets with key server 120. As a result, multiple VPN gateways may register their support of the same "source" subnet, such that the key server sends the same key material to each of those VPN gateways because the source subnet identity used by the key server to create the key material is the same in each case. Also, if a given VPN gateway registers for multiple subnets, the key server 120 sends multiple sets of key material, one for each subnet. Key server 120 maps all VPN gateways to their respectively registered "source" subnets.

Figure 3:
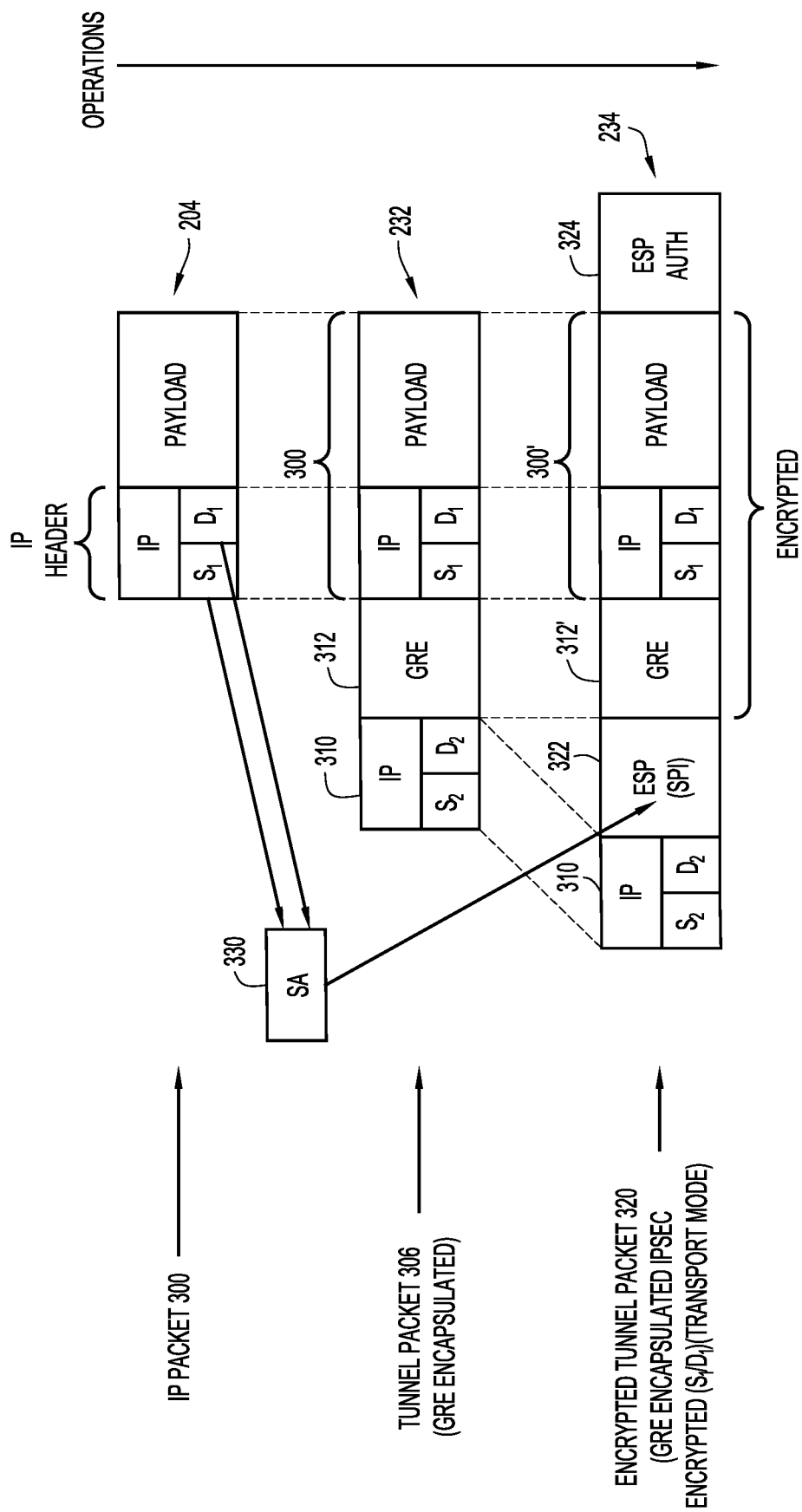
FIG. 3 shows data packets after/resulting from various operations of the method of FIG. 2A, according to an example embodiment.

At 204, the VPN gateway receives a clear-text IP packet originated from a source subnet among the source subnets supported by the source VPN gateway and destined for a destination subnet supported by the destination VPN gateway (note: from the perspective of the destination VPN gateway, the destination subnet is actually a source subnet for traffic flowing in a reverse direction from the destination VPN gateway to the source VPN gateway). With reference to FIG. 3, there is shown an example clear-text IP packet 300 including an IP header indicating a source IP address S1 and a destination IP address D1 corresponding to the source subnet and the destination subnet, respectively.

At 206, upon receiving the IP packet, the source VPN gateway accesses a security policy database (SPD) including security policy entries each indexed by a respective traffic selector tuple [source IP address, destination IP address]. Each SPD entry indicates a security policy (e.g., protect traffic using IPsec, do not protect traffic, and so on) governing data traffic matched to the tuple that indexes that SPD entry. Using the SPD, the source VPN gateway determines whether IPsec protection is to be applied to the IP packet. For example, the VPN gateway finds an entry in the SPD having an index tuple that matches the [source IP address, destination IP address] tuple from a header of the IP packet, and examines the policy defined in the found entry. If the entry indicates that IPsec protection is not to be applied to the IP packet, flow proceeds to 208, where the flow ends. If the entry indicates that IPsec protection is to be applied, flow proceeds to 210. In the example of FIG. 3, the source VPN gateway searches the SPD based on the tuple [source IP addresses S1, destination IP address D2] from IP packet 300.

Assuming operation 206 determines that IPsec protection is to be applied, flow proceeds to next operations (described below) at which the source VPN gateway determines a security association, including an encryption key and a security parameter index, with which to apply the IPsec protection. Next operations 210-212 may find and retrieve a preexisting security association, otherwise, next operations 216-220 may create a new security association, as described below. Operation set 210-212 and operation set 216-220 are both considered operation sets that determine the security association.

At 210, the source VPN gateway accesses a current security association (SA) database (SAD) including entries for SAs each indexed by a respective traffic selector tuple [source IP address, destination IP address] or [source subnet identifier, destination subnet identifier]. Each entry indicates a unique IPsec SA for applying security protection (e.g., encryption and/or authentication) to traffic matched to the tuple that indexes that SAD entry. Each SA includes the tuple, an encryption key, and a security parameter index (SPI).

At 212, the source VPN gateway determines whether the SAD includes an SA for the IP packet based on the tuple [source IP address, destination IP address] of the IP packet. In the example of FIG. 3, the source VPN gateway searches the SAD for an existing SA that matches tuple [source IP address S1, and destination IP address D1] from IP packet 300. If an existing SA is found in the SAD, the VPN gateway retrieves the SA, and flow proceeds to 232. If an existing SA is not found in the SAD, flow proceeds to 216 to create a new SA for the SAD.

At 216, the VPN gateway sends to key server 120 a destination identifier request for a destination subnet identifier. The request includes/indicates a source subnet identifier that the source VPN gateway will use as an indicator of the key material previously sent to the source VPN gateway by key server 120 in operation 202, as well as the destination subnet identifer. For example, the request may include the source and destination IP addresses from the IP packet.

In response to the destination identity request, key server 120:
a. Searches the mappings created in operation 202 for a destination subnet identifier that matches the destination IP address using a longest match technique, for example.
b. Sends to the source VPN gateway a reply that includes the destination subnet identifier found in the search and that the VPN gateway is to use to derive an encryption key and an SPI for protecting the traffic, i.e., the clear-text IP packet.
c. Sends to all other VPN gateways found to match in the search of the mappings (i.e., that originally registered their support of the destination subnet found in the search) respective messages that include the source subnet identifier and the destination subnet identifier received from the source VPN gateway. This enables the destination VPN gateway(s) to create matching encryption keys and SPIs for traffic that one of the destination VPN gateway(s) will use to decrypt encrypted tunnel packets sent from the source VPN gateway. Note, key server 120 waits until there is actual IP traffic between two subnets before it relays the aforementioned subnet information to destination subnet VPN gateways, otherwise the key server would have to relay this subnet information to all VPN gateways in the network, which would not scale. Operations performed at the other VPN gateways that receive their respective messages are described below in connection with FIG. 2B.

Only subnet identifiers (and possibly Nonces associated with source subnet identifiers) and IP addresses are passed during the above-mentioned exchange of messages, not encryption keys or SPIs.

At 218, the source VPN gateway receives from key server 120 the reply including the destination subnet identifier.

At 220, the source VPN gateway generates/derives an encryption key and an SPI from the key material for the source subnet provide by key server 120 to the source VPN gateway at operation 202 based on the destination subnet identifier also provided by the key server to the source VPN gateway at operation 216. The source VPN gateway creates a new entry in the SAD to store a new SA including the tuple [source subnet identifier, destination subnet identifier], the encryption key, and the SPI. Flow proceeds to 232.

At 232, the source VPN gateway:
a. Marks the clear-text IP packet for IPsec protection (e.g., encryption). The source VPN gateway may mark an encryption beginning location and an encryption end location of the IP packet as stored in memory.
b. Encapsulates the clear-text IP packet with tunnel encapsulation including a tunnel protocol header and an outer (tunnel) IP header, to produce a clear-text tunnel packet. In an example, the tunnel protocol header includes a Generic Routing Encapsulation (GRE) header, and the outer IP header includes source and destination (WAN) IP addresses of the VPN gateway and the destination VPN gateway for tunneling over one of WAN transport networks 104. Flow proceeds to operation 234. In the example of FIG. 3, there is shown an example clear-text tunnel packet 306 produced at operation 232. Clear-text tunnel packet 306 includes outer IP header 310, a GRE header 312 (i.e., the tunnel protocol header), and clear-text IP packet 300.

At 234, the source VPN gateway applies IPsec protection to the clear-text tunnel packet as marked at operation 232, i.e., the protection starts just after the outer IP header. For example, the source VPN gateway encrypts the clear-text IP packet and the tunnel protocol header, but not the outer IP header, of the clear-text tunnel packet using the encryption key and the SPI associated with the SA either found in operation 210 or derived in operation 220, to produce an encrypted tunnel packet, which carries (i) encrypted portions including the IP packet and the tunnel protocol header, and (ii) clear-text portions including the outer IP header and ESP fields, which may be spaced-apart depending on the specific security protocol used. Thus, the encrypted tunnel packet may also be referred to as a "partly" encrypted tunnel packet. Operation 234 may use transport mode IPsec encryption. Alternatively, operation 234 may use tunnel mode encryption. The source VPN gateway sends the encrypted tunnel packet to the destination VPN gateway over one of WANs 104 according to the tunnel encapsulation outer IP header.

Figure 2B:
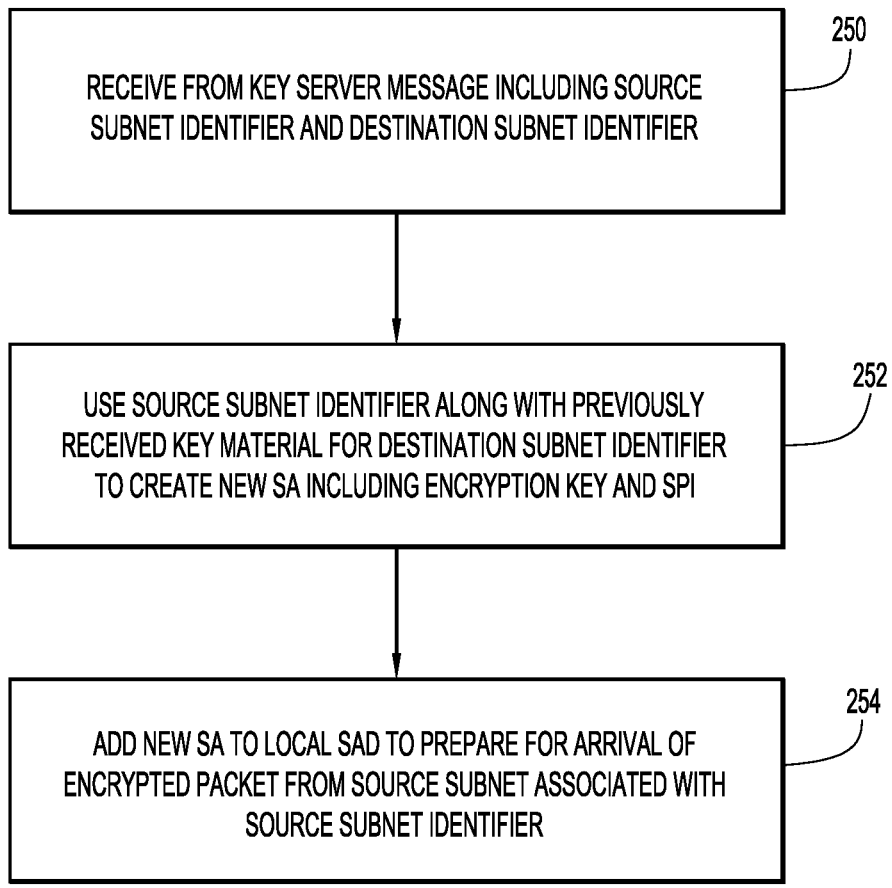
FIG. 2B is a flowchart of a method of handling messages from a key server of FIG. 1 performed by a VPN gateway and that is based on the method of FIG. 2A, according to an example embodiment.

With reference to FIG. 2B, there is a flowchart that shows operations performed by one of the "other VPN gateways" upon receiving the message sent by key server 120 to the one of other VPN gateways (referred to as the "other VPN gateway" below) at operation 216(c) described above.

At 250, the other VPN gateway receives from key server 120 the message including the source subnet identifier and the destination subnet identifier (refer to operation 216(c) above).

At 252, upon receiving the message, the other VPN gateway uses the source subnet identifier along with the key material (referred to as the "destination key material") already in its possession due to prior registration with key server 120 and that is associated with its locally supported subnet (i.e., that matches the destination subnet identifier) to create an encryption key and an SPI.

At 254, the other VPN gateway adds to its local SAD a new SA, including the encryption key and the SPI generated in operation 252, so that the other VPN gateway is prepared for the arrival of an encrypted packet from the source subnet associated with the source subnet identifier, i.e., is able to find the security association using the SPI value from the arriving encrypted packet, and decrypt the arriving encrypted packet using the SA.

In the example of FIG. 3, there is shown an encrypted tunnel packet 320 including clear-text (i.e., unencrypted) outer IP header 310 with source and destination WAN IP addresses S2, D2 for the source and the destination VPN gateways, spaced-apart clear-text IPsec encapsulating security payload (ESP) fields 322 (encryption field) and 324 (authentication field), encrypted GRE header 312', and encrypted IP packet 300'. An SA 330 (retrieved or created at operations 210 or 220, respectively) used to encrypt encrypted tunnel packet 320 is indexed to now encrypted source and destination IP addresses S1, D1, but also to the clear-text SPI included in clear-text IPsec encapsulating security payload (ESP) field 322. Accordingly, while inner IP addresses S1, D1 are used for crypto classification, decryption is not reliant on peer addresses S2, D2 because the clear-text SPI identifies the SA, while the GRE header (i.e., the tunnel protocol header) is protected.

Figure 4:
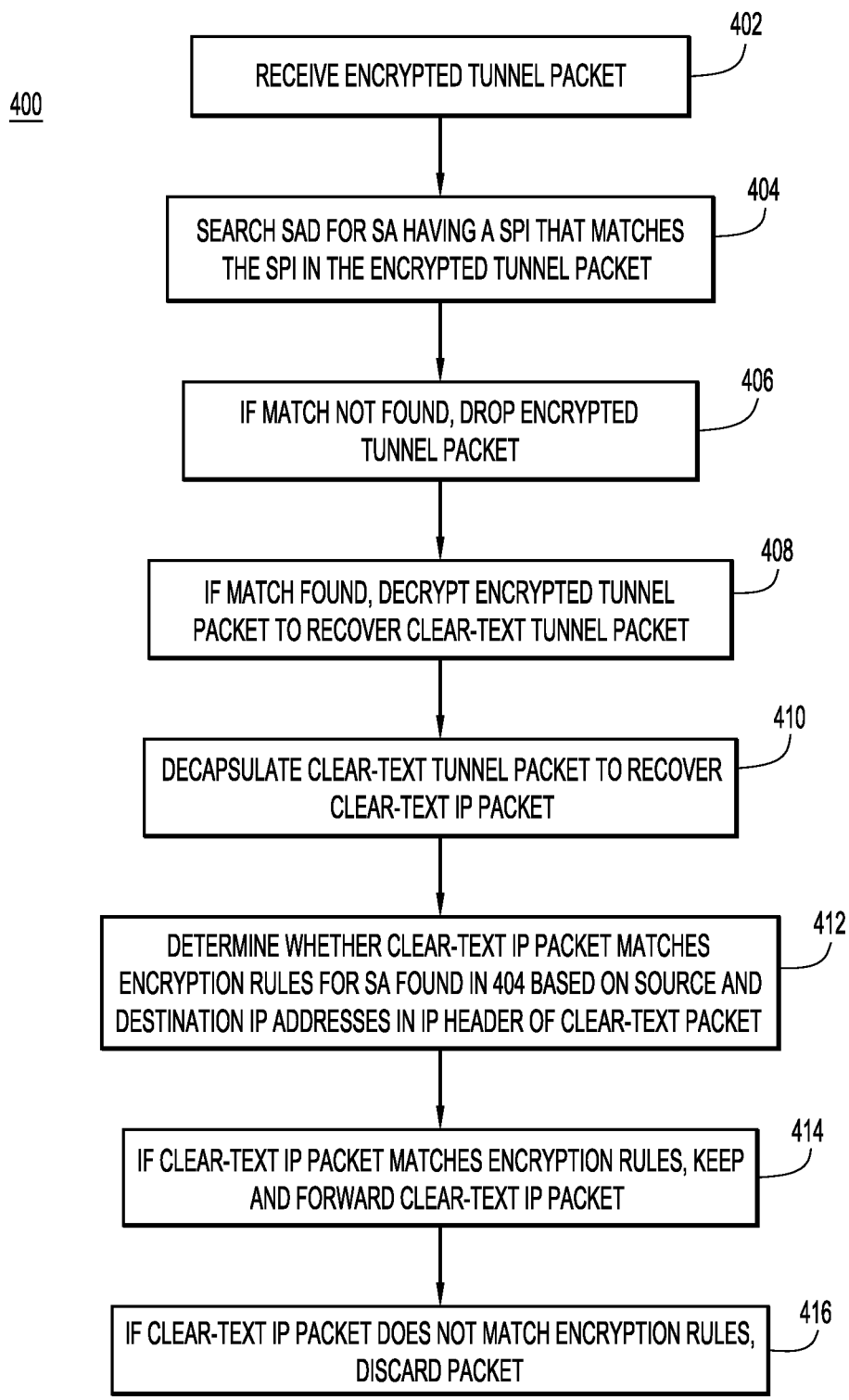
FIG. 4 is a flowchart of a method of processing an encrypted tunnel packet performed at a destination VPN gateway, according to an example embodiment.

With reference to FIG. 4, there is a flowchart of an example method 400 of processing (e.g., decrypting) the encrypted tunnel packet sent from the source VPN gateway to the destination VPN gateway in method 200, performed primarily at the destination VPN gateway. Method 400 is described also with reference to FIG. 1 and FIG. 5, which shows illustrations of data packets after/resulting from various operations of method 400.

Figure 5:
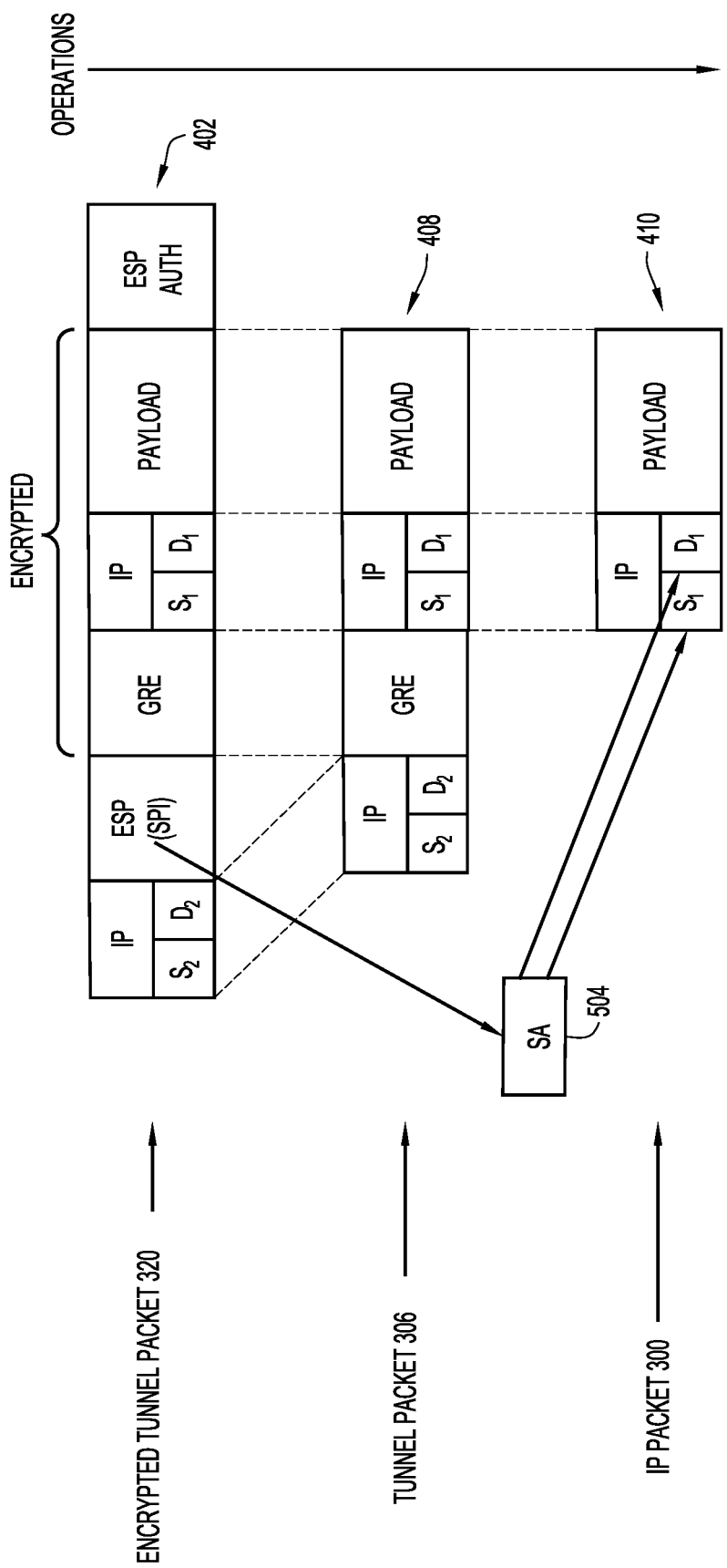
FIG. 5 shows data packets after/resulting from various operations of the method of FIG. 4, according to an example embodiment.

At 402, the destination VPN gateway receives the encrypted tunnel packet. In the example of FIG. 5, the destination VPN gateway receives encrypted tunnel packet 320.

At 404, the destination VPN gateway determines whether there is an SA for the received packet. For example, the destination VPN gateway searches its local SAD for an SA having an SPI that matches the clear-text SPI from the encrypted tunnel packet.

If no matching SA is found in the search, at 406, the destination VPN gateway drops the encrypted tunnel packet because it was directed to an incorrect VPN gateway. This implies the subnet-to-VPN gateway mapping stored in key server 120 is not consistent with a tunneling subnet-to-tunnel VPN gateway mapping, or that the destination VPN GW has not yet received and/or processed a "source subnet" message from the key server.

If a matching SA is found in the search, at 408, the destination VPN gateway uses the found SA to decrypt the encrypted tunnel packet, to recover the clear-text tunnel packet. In the example of FIG. 5, the destination VPN gateway finds an SA 504 in the local SAD having an SPI that matches the clear-text SPI in encrypted tunnel packet 320, and recovers clear-text tunnel packet 306 from encrypted tunnel packet 320 using the encryption key and the SPI in the found SA. In an example of operation 408, an ESP integrity check value (ICV) (also referred to as an "ESPAuth field") is checked before decryption and, if the ESP ICV check fails, the encrypted tunnel packet is discarded, otherwise it is decrypted using the encryption key.

At 410, the destination VPN gateway decapsulates the clear-text tunnel packet, to recover the clear-text IP packet.

In the example of FIG. 5, the destination VPN gateway decapsulates tunnel packet 306 to recover clear-text IP packet 300.

At 412, the destination VPN gateway determines whether the clear-text IP packet matches the encryption rules for the SA found in operation 404 and used in operation 408 governing protection of the IP packet. For example, the destination VPN gateway matches the tuple [source IP address (e.g., S1), destination IP address (e.g., D1)] from the IP header of the clear-text IP packet to the encryption rules of the SA used to decrypt the encrypted tunnel packet that resulted in the clear-text IP packet.

If the check indicates that the clear-text IP packet matches the encryption rules, at 414, the destination VPN gateway keeps the clear-text IP packet and forwards the packet to next stage processing (e.g., onto its next destination). Note that the source and destination IP addresses from the clear-text IP packet (after decryption and tunnel decapsulation) must match the encryption rules from the exact SA that was used to decrypt the packet that resulted in the clear-text IP packet. Another search through the SAD cannot be made, since that would allow a packet that is decrypted by one SA to result in a clear-text packet that matches a different SA. This would allow forwarding of spoofed packets.

If the check indicates that the clear-text IP packet does not match the encryption rules, at 416, the destination VPN gateway drops/discards the clear-text IP packet.

Accordingly, method 400 uses only the clear-text SPI from the encrypted tunnel packet to select an SA for decryption. Decryption is not reliant on crypto peer addresses S2, D2, and the decryption is cross-checked with information in the SA after decapsulation.

Figure 6:
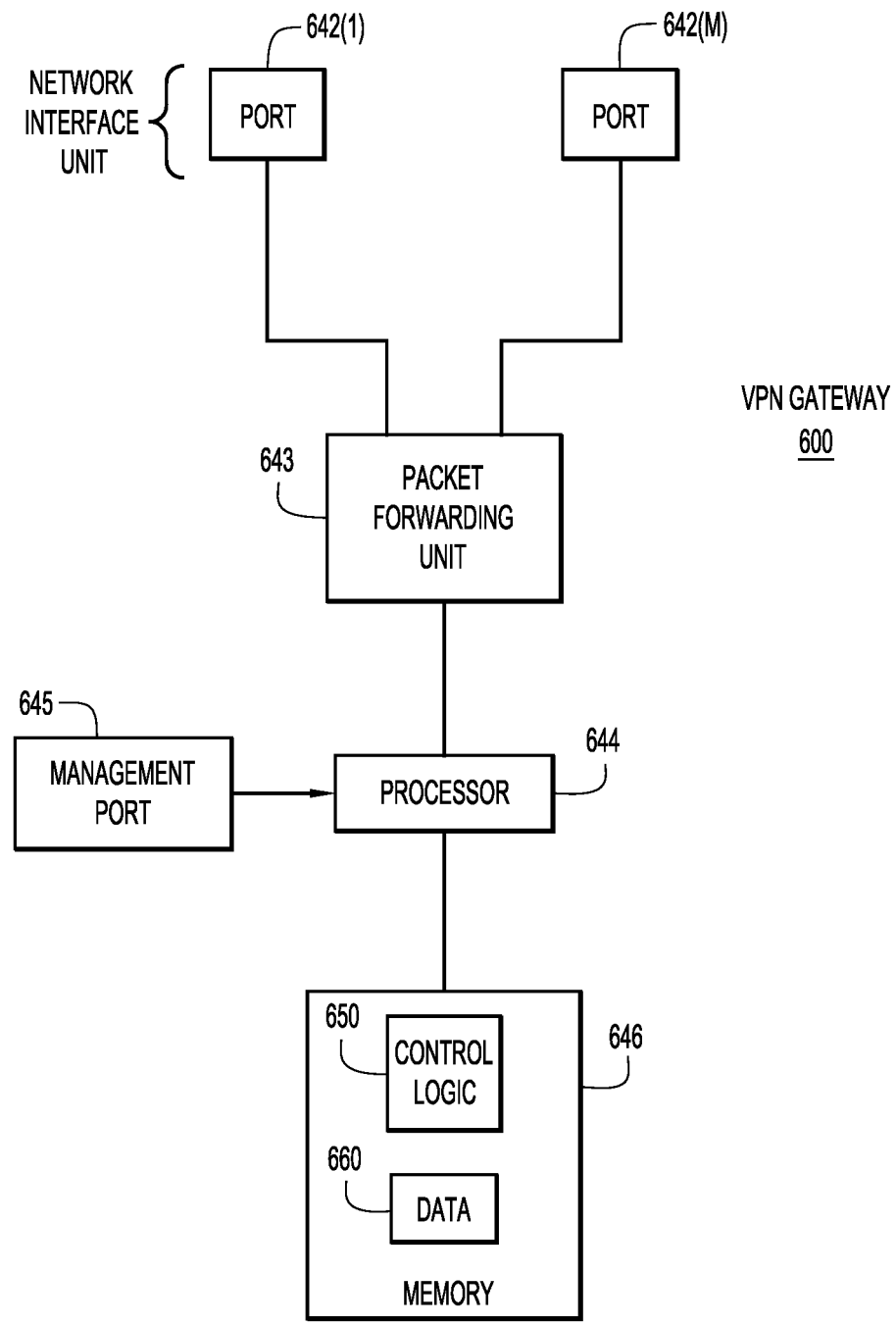
FIG. 6 is a block diagram of a network device representative of a VPN gateway of FIG. 1, according to an example embodiment.

With reference to FIG. 6, there is a block diagram of an example network device 600, representative of each of the VPN gateways depicted in FIG. 1. Network device 600 may include a network router or a switch, for example. Network device 600 comprises a network interface unit having a plurality of network input/output (I/O) ports 642(1)-642(M) to send traffic (e.g., IP packets) to a network (e.g., networks 104, 106A, 106B) and receive traffic (e.g., IP packets) from the networks, a packet forwarding/processing unit 643, a network processor 644 (also referred to simply as "processor"), a management port 645 to exchange control messages with other network devices and an administration function, and a memory 646. The packet forwarding/processing unit 643 is, for example, one or more application specific integrated circuits (ASICs) that include packet buffers, packet queues, and other control logic for performing packet forwarding operations. The processor 644 may include multiple processors, which may be implemented as software or hardware processors. For example, processor 644 may include a microcontroller or microprocessor that is configured to perform higher level controls of network device 600. To this end, the memory 646 stores software instructions that, when executed by the processor 644, cause the processor 644 to perform a variety of operations including operations described herein. For example, the memory 646 stores instructions for control logic 650 to perform operations described herein including methods 200 and 400, described above. Control logic 650 may also include logic components in packet forwarding unit 643. Memory 646 also stores data 660 used and generated by logic 650. Such data may include a security association database, a security policy database, key material, and data packets at various stages of processing in methods 200 and 400, as described above.

Figure 7:
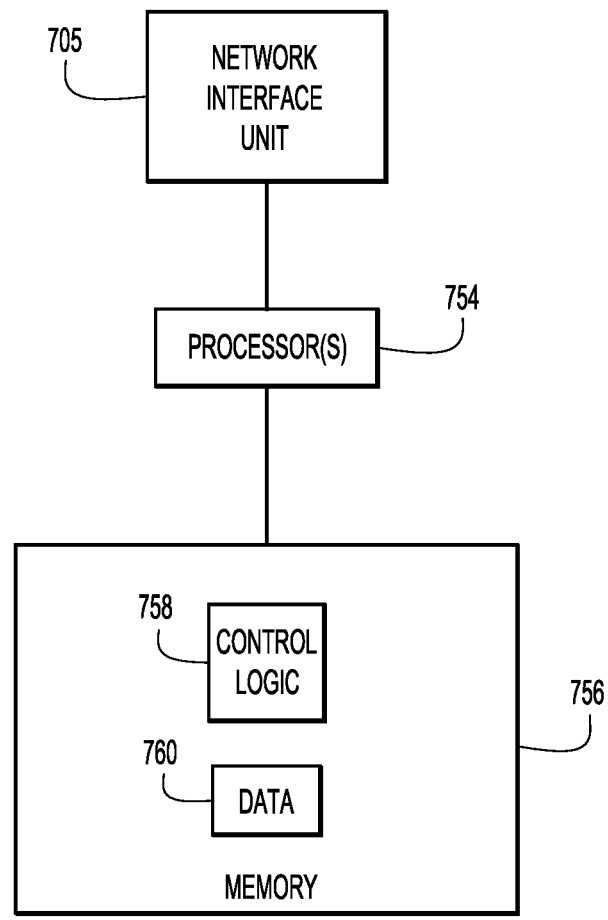
FIG. 7 is a block diagram of a computer device, such as a server device, representative of the key server, according to an example embodiment.

With reference to FIG. 7, there is a block diagram of an example computer device 700, such as a server device representative of key server 120. Computer device 700 includes network interface unit 705 to communicate with a wired and/or wireless communication network. Computer device 700 also includes a processor 754 (or multiple processors, which may be implemented as software or hardware processors), and memory 756. Network interface unit 705 may include an Ethernet card with a port (or multiple such devices) to communicate over wired Ethernet links and/or a wireless communication card with a wireless transceiver to communicate over wireless links.

Memory 756 stores instructions for implementing methods described herein. Memory 756 may include read only memory (ROM), random access memory (RAM), magnetic disk storage media devices, optical storage media devices, flash memory devices, electrical, optical, or other physical/tangible (non-transitory) memory storage devices. The processor 754 is, for example, a microprocessor or a microcontroller that executes instructions stored in memory. Thus, in general, the memory 756 may comprise one or more tangible computer readable storage media (e.g., a memory device) encoded with software comprising computer executable instructions and when the software is executed (by the processor 754) it is operable to perform the operations described herein. For example, memory 756 stores control logic 758 to perform operations for key server 120 as described herein. The memory 756 may also store data 760 used and generated by logic 758, such as key material for each subnet registered by VPN gateways and mappings between source subnets and VPN gateways that support the source subnets.

Figure 8:
FIG. 8 is an illustration of bidirectional security associations in a security association database, according to an example embodiment.

With reference to FIG. 8, there is an illustration of an example SAD 800 for a single peer-to-peer session. SAD 800 includes rows of SA parameters for a first SA in an outbound direction (column 804) and a second SA in an inbound direction (column 806). The SA parameters include source and destination addresses, an IPsec protocol (e.g., ESP), an encryption algorithm (e.g., data encryption standard (DES)), inbound and outbound encryption keys, and IPsec encryption mode (e.g., transport).

Figure 9:
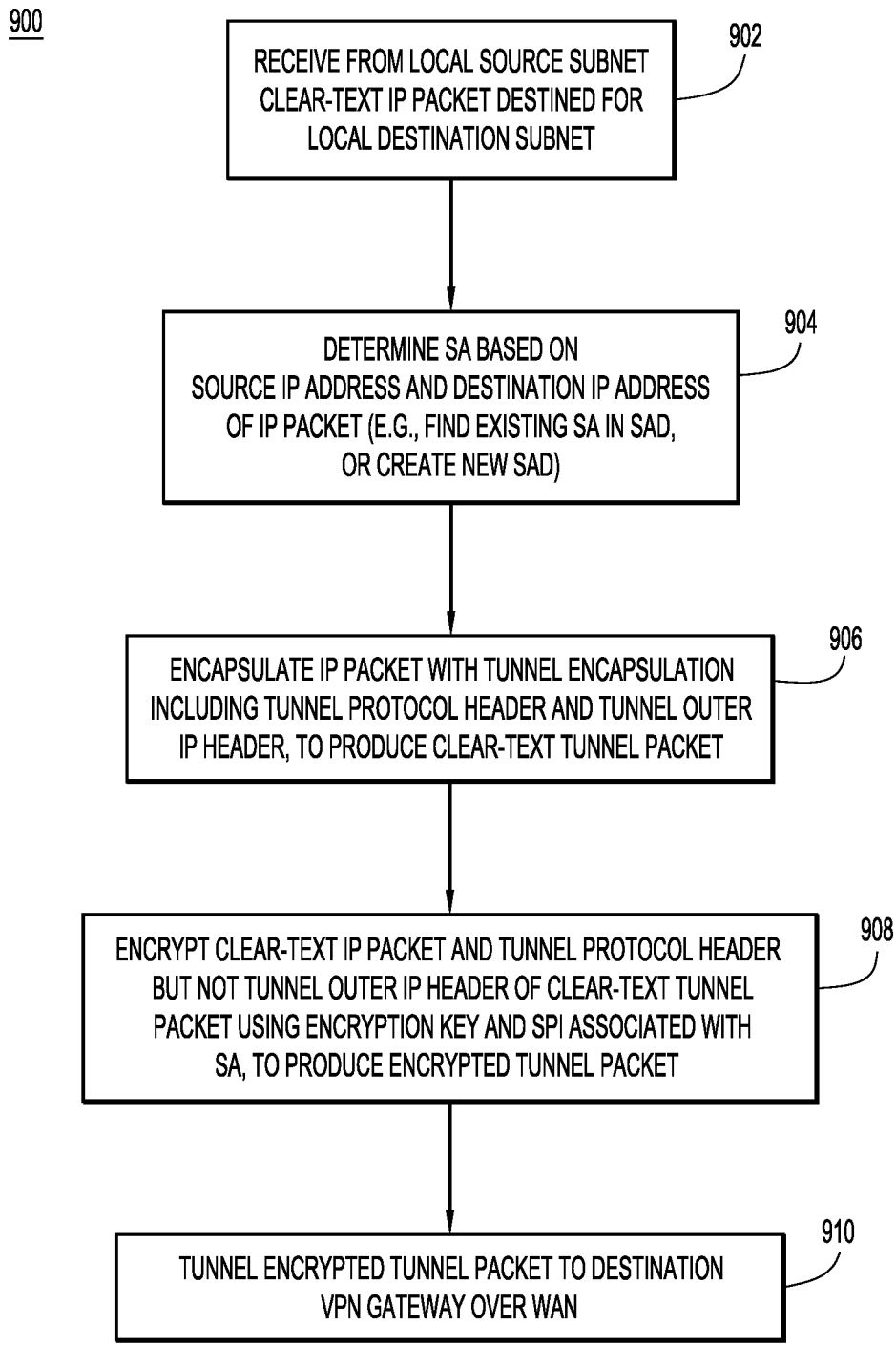
FIG. 9 is a high-level flowchart of a method of encryption for gateway tunnel-based VPNs independent of transport (WAN) addressing that includes features from the method of FIG. 2A.

With reference to FIG. 9, there is a high-level flowchart of an example method 900 of encryption for gateway tunnel-based VPNs independent of transport (WAN) addressing that includes features from method 200. Method 900 is performed at a source VPN gateway.

At 902 the source VPN gateway receives from a local source subnet a clear-text IP packet destined for a local destination subnet.

At 904, the source VPN gateway determines for the IP packet an SA for IPsec protection based on a source IP address and a destination IP address of the IP packet. Operation 904 may include generating the SA in accordance with operations 216-220 as described above.

At 906, the source VPN gateway encapsulates the IP packet with tunnel encapsulation including a tunnel protocol header and a tunnel outer IP header, to produce a clear-text tunnel packet.

At 908, the source VPN gateway encrypts the IP packet and the tunnel protocol header but not the outer IP header of the clear-text tunnel packet using an encryption key and a security parameter index associated with the SA, to produce an encrypted tunnel packet. A clear-text ESP field of the encrypted tunnel packet includes the SPI (in clear-text form).

At 910, the source VPN gateway tunnels the encrypted tunnel packet to the destination VPN gateway over a WAN via an encrypted tunnel indicated by the tunnel encapsulation.

In summary, embodiments presented herein solve the following problems: when using conventional IPsec tunnels between a set of gateways, which may be connected over multiple interfaces with different IP address, the result can be a full mesh of (N1*N2*M) IPsec security associations, where N1 or N2=number of load balancing IPsec gateways at site 1 or 2, respectively, and M=number of transports between them. This leads to scaling issues where many IPsec tunnels may be setup between site 1 and site 2. Conventional approaches used to mitigate the scaling issues use group keys to protect traffic between the IPsec gateways, such as implementing GETVPN; however, use of group keys may not adequately satisfy the security requirements of all WANs.

To solve the above-mentioned problems, embodiments presented herein adapt the use of subnet-specific encryption keys to tunneled-IPsec use cases. Thus, IPsec transport mode can encapsulate a data packet because of use of a GRE header, which also reduces the total number of IP headers in the finally encrypted packet/frame. On encapsulation, the IPsec SPD evaluation is performed on original [src-IP, dst-IP] addresses to determine an SA. The GRE (or other tunnel) encapsulation is then performed, and finally the IPsec policy is applied to the tunnel encapsulated packet. Conventionally, the SA choice would include the tunnel encapsulation (e.g., the SPD would indicate "GRE src=t1, dst=t2"), but according to the embodiments presented herein, the new order of operations allows for the SPD to indicated "IP src=x, dst=y." Yet the result is a GRE packet where the entire contents of the GRE payload are encrypted and, from the perspective of bits-on-the-wire, the packet appears as a normal IPsec packet.

Upon decapsulation, the SA lookup will find the correct SA based on a SPI-only lookup. The decryption/decapsulation, and the after-decryption SA lookup check, skip the outer (e.g., GRE) encapsulation. This enables a KGS to be efficiently used with the tunnel encapsulated packets over the Internet. The result for a single subnet is a single multi-point IPsec security association (irrespective of the number of transports (M)), instead of (N1*N2*M) IPsec security associations as described above.

In one form, a method is provided comprising: at a source virtual private network (VPN) gateway configured to support a local source subnet and communicate over a wide area network with a destination VPN gateway configured to support a local destination subnet: receiving from the local source subnet an Internet Protocol (IP) packet as clear-text and that is destined for the local destination subnet; determining for the IP packet a security association for an IP security (IPsec) protocol based on a source IP address and a destination IP address of the IP packet; encapsulating the IP packet with tunnel encapsulation including a tunnel protocol header and a tunnel outer IP header, to produce a clear-text tunnel packet; encrypting the IP packet and the tunnel protocol header but not the tunnel outer IP header of the clear-text tunnel packet using an encryption key and a security parameter index associated with the security association, to produce an encrypted tunnel packet; and tunneling the encrypted tunnel packet to the destination VPN gateway over the wide area network via an encrypted tunnel indicated by the tunnel encapsulation.

In another form, an apparatus is provided comprising: network ports to communicate with one or more networks;

and a processor of a source virtual private network (VPN) gateway configured to support a local source subnet and communicate over a wide area network with a destination VPN gateway configured to support a local destination subnet, the processor coupled to the network ports and configured to perform: receiving from the local source subnet an Internet Protocol (IP) packet as clear-text and that is destined for the local destination subnet; determining for the IP packet a security association for an IP security (IPsec) protocol based on a source IP address and a destination IP address of the IP packet; encapsulating the IP packet with tunnel encapsulation including a tunnel protocol header and a tunnel outer IP header, to produce a clear-text tunnel packet; encrypting the IP packet and the tunnel protocol header but not the tunnel outer IP header of the clear-text tunnel packet using an encryption key and a security parameter index associated with the security association, to produce an encrypted tunnel packet; and tunneling the encrypted tunnel packet to the destination VPN gateway over the wide area network via an encrypted tunnel indicated by the tunnel encapsulation.

In yet another form, a computer readable medium is provided. The computer readable medium stores instructions that, when executed by a processor of a source virtual private network (VPN) gateway configured to support a local source subnet and communicate over a wide area network with a destination VPN gateway configured to support a local destination subnet, are operable to perform: receiving from the local source subnet an Internet Protocol (IP) packet as clear-text and that is destined for the local destination subnet; determining for the IP packet a security association for an IP security (IPsec) protocol based on a source IP address and a destination IP address of the IP packet; encapsulating the IP packet with tunnel encapsulation including a tunnel protocol header and a tunnel outer IP header, to produce a clear-text tunnel packet; encrypting the IP packet and the tunnel protocol header but not the tunnel outer IP header of the clear-text tunnel packet using an encryption key and a security parameter index associated with the security association, to produce an encrypted tunnel packet; and tunneling the encrypted tunnel packet to the destination VPN gateway over the wide area network via an encrypted tunnel indicated by the tunnel encapsulation.

Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at a source virtual private network (VPN) gateway configured to support a local source subnet and communicate over a wide area network with a destination VPN gateway configured to support a local destination subnet:
   receiving from the local source subnet an Internet Protocol (IP) packet as clear-text and that is destined for the local destination subnet, the IP packet including subnet identifiers for the local source subnet and the local destination subnet;
   determining for the IP packet a security association for an IP security (IPsec) protocol based on the subnet identifiers in the IP packet rather than wide area network tunnel addresses of the source VPN gateway and the destination VPN gateway;
   encapsulating the IP packet with tunnel encapsulation including a tunnel protocol header and a tunnel outer IP header, to produce a clear-text tunnel packet;
   encrypting the IP packet and the tunnel protocol header but not the tunnel outer IP header of the clear-text tunnel packet to produce an encrypted tunnel packet, the encrypting using an encryption key and a security parameter index that are associated with the security association and derived based on the subnet identifiers, such that a local subnet address space of the encryption is separate from the wide area network tunnel addresses; and
   tunneling the encrypted tunnel packet to the destination VPN gateway over the wide area network via an encrypted tunnel indicated by the tunnel encapsulation.

2. The method of claim 1, wherein the determining includes:
   searching a security association database for the security association based on a source subnet identifier of the subnet identifiers for the local source subnet and a destination subnet identifier of the subnet identifiers for the local destination subnet that match a source IP address and a destination IP address of the IP packet, respectively; and
   if the security association is found in the searching, accessing the encryption key and the security parameter index associated with the security association.

3. The method of claim 2, further comprising:
   if the security association is not found in the searching, generating the security association, including:
   sending to a key server a request for the destination subnet identifier that matches the IP destination address, and receiving from the key server the destination subnet identifier; and
   generating the security association, including the encryption key and the security parameter index, using key material associated with the source subnet identifier based on the destination subnet identifier.

4. The method of claim 3, further comprising, at the key server, upon receiving the request:
   sending the destination subnet identifier to the source VPN gateway; and
   sending the destination subnet identifier and the source subnet identifier to all other VPN gateways that previously registered the destination subnet identifier with the key server.

5. The method of claim 1, further comprising:
   prior to the receiving the IP packet, upon registering with a key server a source subnet identifier for the local source subnet, receiving from the key server key material associated with the local source subnet.

6. The method of claim 1, wherein the encapsulating includes encapsulating the IP packet with the tunnel outer IP header to include a wide area network source IP address and a wide area network destination IP address corresponding to the source VPN gateway and the destination VPN gateway, respectively.

7. The method of claim 1, wherein the encapsulating includes encapsulating the IP packet with a Generic Routing Encapsulation (GRE) header as the tunnel protocol header.

8. The method of claim 1, wherein the encrypting includes encrypting the IP packet using transport mode encryption according to the IP security protocol.

9. The method of claim 1, wherein the encrypted tunnel packet includes an encapsulating security payload (ESP) field that includes the security parameter index in clear-text, wherein the security parameter index identifies a second security association, including an encryption key, used for decrypting the encrypted tunnel packet at the destination VPN gateway.

10. The method of claim 1, further comprising, at the destination VPN gateway:
receiving the encrypted tunnel packet over the wide area network;
searching a second security association database for a second security association having a security parameter index that matches the security parameter index indicated in a clear-text IP security encapsulating security payload (ESP) field of the encrypted tunnel packet; and
if a match is found, decrypting the encrypted tunnel packet to recover the clear-text tunnel packet using an encryption key associated with the second security association.

11. The method of claim 10, further comprising, at the destination VPN gateway:
if a match is not found, dropping the encrypted tunnel packet.

12. The method of claim 1, further comprising, at a key server configured to communicate with the source VPN gateway and the destination VPN gateway:
upon each VPN gateway registering with the key server the respective local subnet supported by the VPN gateway, generating key material associated with the respective local subnet and sending to each VPN gateway the respective key material, which the VPN gateway uses to derive a respective encryption key and a respective security parameter index associated with a respective IP security security association.

13. A apparatus comprising:
network ports to communicate with one or more networks; and
a processor of a source virtual private network (VPN) gateway configured to support a local source subnet and communicate over a wide area network with a destination VPN gateway configured to support a local destination subnet, the processor coupled to the network ports and configured to perform:
receiving from the local source subnet an Internet Protocol (IP) packet as clear-text and that is destined for the local destination subnet, the IP packet including subnet identifiers for the local source subnet and the local destination subnet;
determining for the IP packet a security association for an IP security (IPsec) protocol based on the subnet identifiers in the IP packet rather than wide area network tunnel addresses of the source VPN gateway and the destination VPN gateway;
encapsulating the IP packet with tunnel encapsulation including a tunnel protocol header and a tunnel outer IP header, to produce a clear-text tunnel packet;
encrypting the IP packet and the tunnel protocol header but not the tunnel outer IP header of the clear-text tunnel packet to produce an encrypted tunnel packet, the encrypting using an encryption key and a security parameter index that are associated with the security association and derived based on the subnet identifiers, such that a local subnet address space of the encryption is separate from the wide area network tunnel addresses; and
tunneling the encrypted tunnel packet to the destination VPN gateway over the wide area network via an encrypted tunnel indicated by the tunnel encapsulation.

14. The apparatus of claim 13, wherein the processor is configured to perform the determining by:

searching a security association database for the security association based on a source subnet identifier of the subnet identifiers for the local source subnet and a destination subnet identifier of the subnet identifiers for the local destination subnet that match a source IP address and a destination IP address of the IP packet, respectively; and
if the security association is found in the searching, accessing the encryption key and the security parameter index associated with the security association.

15. The apparatus of claim 14, wherein the processor is configured to perform:
if the security association is not found in the searching, generating the security association, including:
sending to a key server a request for the destination subnet identifier that matches the IP destination address, and receiving from the key server the destination subnet identifier; and
generating the security association, including the encryption key and the security parameter index, using key material associated with the source subnet identifier based on the destination subnet identifier.

16. The apparatus of claim 13, wherein the processor is configured to perform:
prior to the receiving the IP packet, upon registering with a key server a source subnet identifier for the local source subnet, receiving from the key server key material associated with the local source subnet.

17. The apparatus of claim 13, wherein the processor is configured to perform the encapsulating by encapsulating the IP packet with the tunnel outer IP header to include a wide area network source IP address and a wide area network destination IP address corresponding to the source VPN gateway and the destination VPN gateway, respectively.

18. A non-transitory computer readable medium encoded with instructions that, when executed by a processor of a source virtual private network (VPN) gateway configured to support a local source subnet and communicate over a wide area network with a destination VPN gateway configured to support a local destination subnet, are operable to perform:
receiving from the local source subnet an Internet Protocol (IP) packet as clear-text and that is destined for the local destination subnet, the IP packet including subnet identifiers for the local source subnet and the local destination subnet;
determining for the IP packet a security association for an IP security (IPsec) protocol based on the subnet identifiers in the IP packet rather than wide area network tunnel addresses of the source VPN gateway and the destination VPN gateway;
encapsulating the IP packet with tunnel encapsulation including a tunnel protocol header and a tunnel outer IP header, to produce a clear-text tunnel packet;
encrypting the IP packet and the tunnel protocol header but not the tunnel outer IP header of the clear-text tunnel packet to produce an encrypted tunnel packet, the encrypting using an encryption key and a security parameter index that are associated with the security association and derived based on the subnet identifiers, such that a local subnet address space of the encryption is separate from the wide area network tunnel addresses; and
tunneling the encrypted tunnel packet to the destination VPN gateway over the wide area network via an encrypted tunnel indicated by the tunnel encapsulation.

19. The non-transitory computer readable medium of claim 18, wherein the instructions operable to perform the determining include instructions operable to perform:

searching a security association database for the security association based on a source subnet identifier of the subnet identifiers for the local source subnet and a destination subnet identifier of the subnet identifiers for the local destination subnet that match a source IP address and a destination IP address of the IP packet, respectively; and if the security association is found in the searching, accessing the encryption key and the security parameter index associated with the security association.

20. The non-transitory computer readable medium of claim 19, wherein the instructions further include instructions operable to perform:

if the security association is not found in the searching, generating the security association, including:

sending to a key server a request for the destination subnet identifier that matches the IP destination address, and receiving from the key server the destination subnet identifier; and generating the security association, including the encryption key and the security parameter index, using key material associated with the source subnet identifier based on the destination subnet identifier.

\* \* \* \* \*